United States Patent [19]

Berchem et al.

[11] Patent Number: 4,711,088
[45] Date of Patent: Dec. 8, 1987

[54] LIQUID COOLED EXHAUST MANIFOLD

[75] Inventors: Donald J. Berchem, West Bend; James R. Meininger, Plymouth, both of Wis.

[73] Assignee: Chrysler Motors Corporation, Highland Park, Mich.

[21] Appl. No.: 1,500

[22] Filed: Jan. 8, 1987

[51] Int. Cl.⁴ .......................... F01N 3/02; F01N 7/10
[52] U.S. Cl. ............................................... 60/321
[58] Field of Search ................................. 60/321, 320

[56] References Cited

U.S. PATENT DOCUMENTS 2,060,187  11/1936  Fernstrum ........................... 60/321
2,858,667  11/1958  Reske .................................. 60/321
3,169,365  2/1965   Benjamin ............................ 60/321
3,261,337  7/1966   Muller ................................. 60/320

FOREIGN PATENT DOCUMENTS 719604  11/1931  France ................................. 60/321

Primary Examiner—Douglas Hart
Attorney, Agent, or Firm—Kenneth H. MacLean, Jr.

[57] ABSTRACT

A liquid cooled exhaust manifold with spaced and separated passages associated with each exhaust port of an associated internal combustion engine and with a transversely extending common coolant distributing passage to evenly supply the separated coolant passages.

3 Claims, 7 Drawing Figures

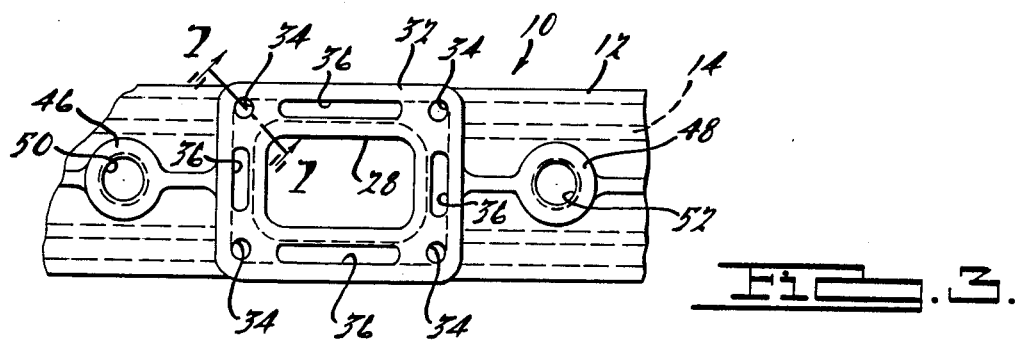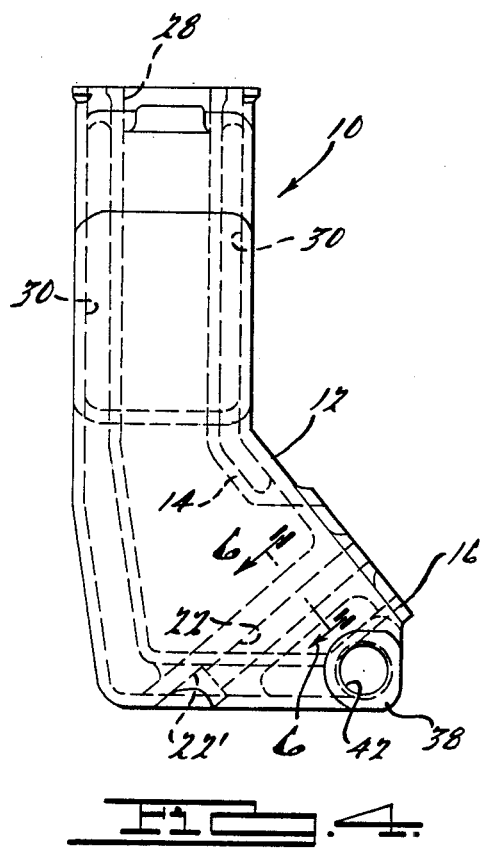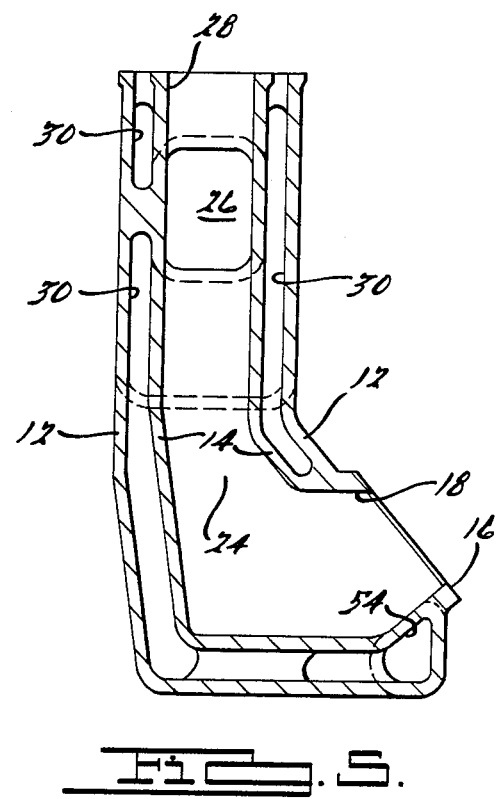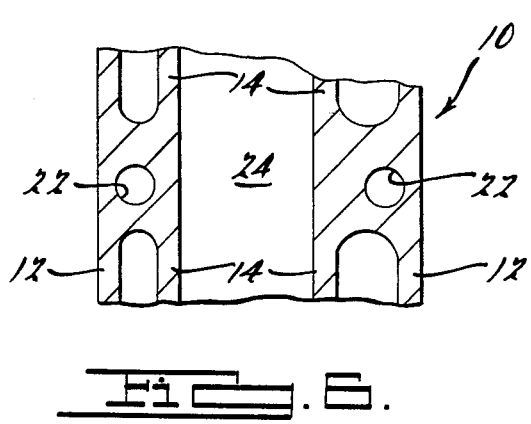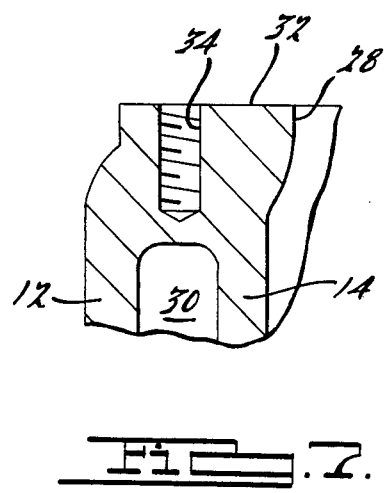

LIQUID COOLED EXHAUST MANIFOLD

BACKGROUND OF THE INVENTION

Liquid cooled exhaust manifolds are used in association with internal combustion engines, particularly for marine applications. In marine applications, it is desirable to limit the temperature of an exhaust manifold and associated exhaust pipes. Because the engines are commonly enclosed in relatively tight engine compartments, it is necessary to cool the exhaust manifolds of the marine engine with a liquid coolant.

A modern, liquid cooled exhaust manifold typically has a configuration similar to the subject exhaust manifold. Specifically, a manifold housing has exhaust gas conduit portions, one for each of the cylinders in a bank of the engine. For example, a V-8 engine utilizes two liquid cooled exhaust manifolds, each having exhaust conduits adapted to carry away the exhaust products of each cylinder for each bank of the engine. It is desirable to provide a high point in the exhaust system above the water line of a boat to prevent any siphonic action. A typical exhaust gas outlet is located high and the inlet apertures are located low on the manifold. The exhaust gases flow upward from the inlets through individual gas passages in the manifold and are connected to a common passage. The common passage is connected to the outlet aperture usually located at the top of the manifold. These upwardly extending exhaust passages for each cylinder extend generally in side-by-side relationship to one another and also are spaced apart corresponding to the exhaust port spacing. The individual exhaust gas passages must also be spaced to provide open spaces or access windows therebetween so that the engine spark plugs can be reached.

Typical exhaust manifolds are cooled by the passage of a liquid coolant such as water which flows through spaces or coolant jackets surrounding the exhaust gas passages. Specifically, the exhaust manifold is a cast structure with a double wall construction, the inner wall of which defines the individual exhaust gas passages and the common exhaust or collector passage. The outer walls of the exhaust manifold define the coolant space or jacket about the inner wall so that liquid coolant can be pumped through the exhaust manifold and about the exhaust carrying passages. This cooling arrangement limits the temperature of the outer wall and permits the engine and manifold to be used in a marine application where high temperatures are undesirable.

SUMMARY OF THE INVENTION

The preceding described a typical liquid cooled exhaust manifold. As previously described, the exhaust manifold has inlet apertures at a lower part of the manifold housing for entry of exhaust gases. Individual gas passages extend vertically therefrom. These exhaust gas passages are formed by the double wall construction of the manifold to several liquid coolant flow passages. In order to provide an even coolant flow through these passages, it has been previously necessary to use multiple coolant inlets in association with each individual coolant passage. Obviously, this produces an undesirably complex and relatively expensive arrangement.

The subject invention concerns a liquid cooled exhaust gas manifold of double wall construction also including a common coolant inlet or distribution passage extending along the lower portion of the manifold normal to the individual coolant passages. Accordingly, the subject manifold utilizes a coolant inlet at either end or both ends of the manifold and a coolnat outlet at an upper portion. This causes the coolant to flow evenly through each individual coolant passage formed about each individual exhaust gas passage.

Further advantageous features of the subject exhaust manifold will be more readily apparent from a reading of the following detailed description of a preferred embodiment, reference being had to the drawings which are described as follows.

IN THE DRAWINGS

FIG. 3 is a partial planar view of the manifold shown in FIG. 1 looking downward onto the outlet aperture located at the upper portion of the manifold;

FIG. 4 is an elevational view of the exhaust gas manifold shown in FIG. 1;

FIG. 5 is a sectioned view of the manifold taken along section line 5—5 in FIG. 1 and looking in the direction of the arrows;

FIG. 6 is a fragmentary and enlarged sectioned view taken along section line 6—6 in FIG. 4 and looking in the direction of the arrows; and FIG. 7 is a fragmentary and enlarged sectioned view taken along section line 7—7 in FIG. 3 and looking in the direction of the arrows.

DETAILED DESCRIPTION OF A PREFERRED EMBODIMENT

Figure 1:
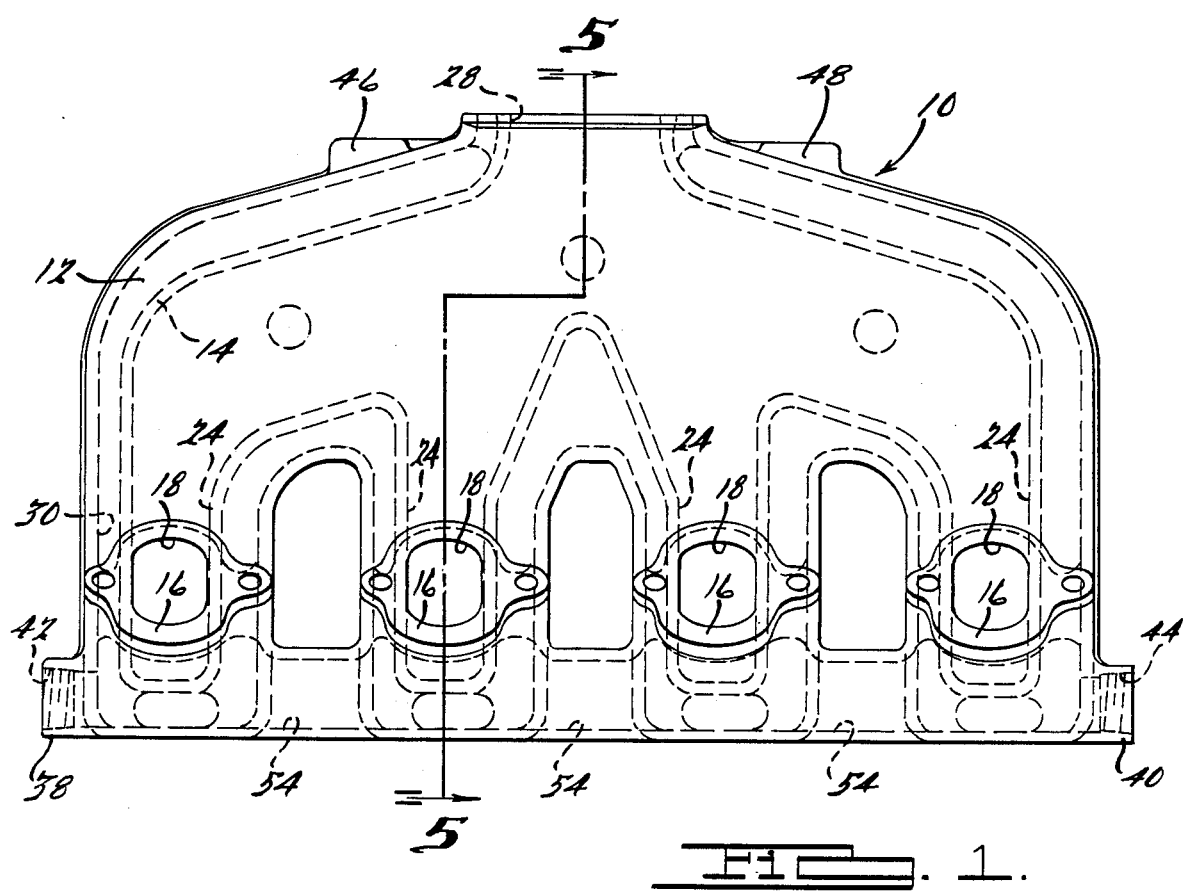
FIG. 1 is a side elevational view of the liquid cooled exhaust gas manifold.
Figure 2:
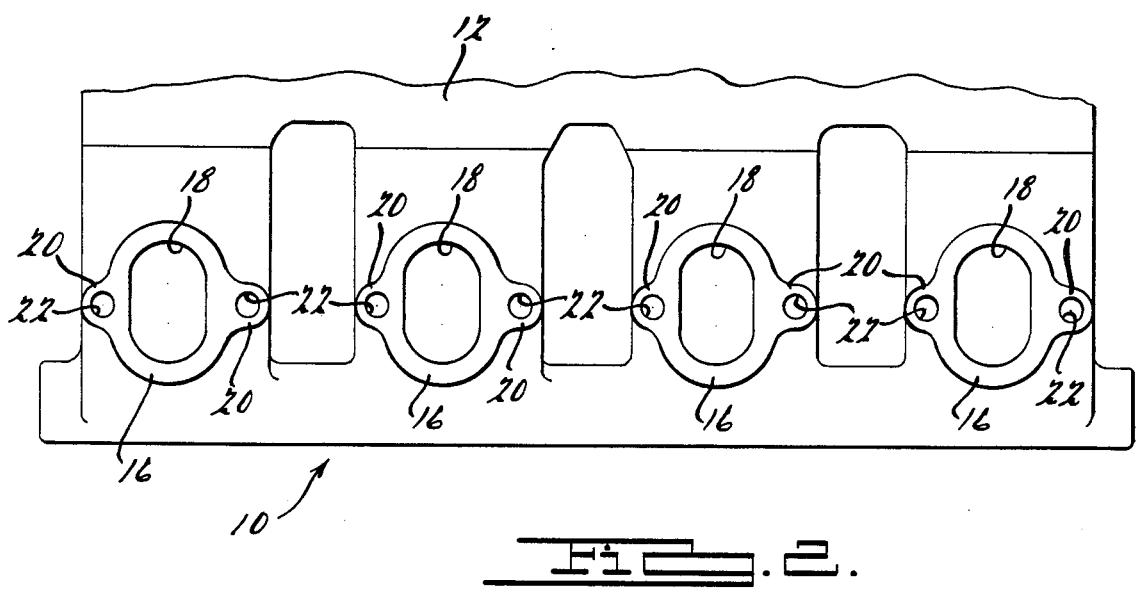
FIG. 2 is a partial elevational view of the manifold shown in FIG. 1 and viewed normally toward the exhaust gas inlet apertures, also shown in FIG. 1.

A liquid cooled exhaust gas manifold 10 is illustrated in the drawings and particularly in overall FIGS. 1-4. The manifold 10 is of a cast metal structure having a double walled structure to form exhaust gas passages therein and surrounding liquid coolant passages. An outer or exterior walled portion 12 encircles an inner walled portion 14. A plurality of exhaust gas inlet fittings 16 difine inlet apertures 18, perhaps as best viewed in FIG. 2. The inlet fittings 16 are spaced apart from one another in conformity with placement of exhaust ports of an associated cylinder head of an internal combustion engine (not shown). Specifically, the inlet fittings 16 are adapted to engage the cylinder block of an internal combustion engine with each inlet aperture 18 aligned with the gas ports of the associated cylinder head. The inlet fittings 16 are provided with an outwardly flanged or thickened surrounding portion 20 for purposes of mating the manifold to the cylinder head. Bolt holes 22 extend therethrough for receiving stud or bolt type fasteners which attach to the cylinder head which has threaded holes formed therein. An enlarged and recessed entry portion 22' to holes 22 accommodates a bolt head or nut fastener (not shown).

As shown in FIGS. 1, 4, and 5, the inlet fittings 16 are located along the lower portion of manifold 10. Accordingly, the inlets 18 receive exhaust gases from individual exhaust ports and combustion chambers of the associated internal combustion engine. The gases then flow from inlets 18 through individual flow passages 24 formed by the manifold's inner walled structure 14. In FIG. 5, a typical individual exhaust gas passage 24 is illustrated between opposite walled portions of the inner structure 14. In FIG. 1, all of the exhaust gas passages 24 are shown. The passages 24 direct exhaust gas generally upward as shown in FIGS. 1, 4, and 5. The individual gas passages are connected together in the upper portion of the manifold 10 by means of a common exhaust gas passage 26. An exhaust gas outlet or aperture 28 is formed in the upper portion of manifold 10 and is fluidly connected to the common exhaust gas passage 26. The outlet 28 is adapted to be connected to further downstream exhaust components. Specifically, typical marine installation utilizes an elbow fitting or connector (not shown) between the exhaust manifold and an exhaust pipe. The elbow connector is of double walled construction, like the manifold and an exhaust gas passage is defined within an inner wall portion. A coolant jacket is formed about the inner wall portion and the outer wall portion. It is desirable to design the elbow connector as the uppermost portion of the marine exhaust system manifold so that, in boat installations, this portion is above the water line of the engine and so that water may be safely injected into the exhaust pipe downstream from the elbow.

As previously mentioned, the exhaust manifold has outer 12 and inner 14 walls. The inner walls define the various exhaust gas flow passages 24 and 26. The outer wall portion 12 defines a coolant flow passage or jacket 30 between the inner and outer walled portions. The coolant jacket 30 permits liquid coolant to flow about the inner walled structure 14. This prevents the transfer of a large portion of the heat energy from exhaust gases to the outer walled surface 12 and the temperature of the outer walled structure 12 is substantially reduced.

Referring specifically to FIG. 3, the gas outlet 28 is illustrated. It is surrounded by an outlet fitting or portion 32. Fitting 32 is adapted to engage a similarly configured portion of the aforementioned elbow connector (not shown). Referring to FIG. 7, the outlet portion 32 is sectioned to show one of four threaded bores 34 adapted to receive bolt fasteners. These are to connect the elbow connector to the manifold. Referring again to FIG. 3, openings 36 which break the surface of the outlet portion 32 are visible. These openings 36 flow coolant into the elbow connector through the similarly constructed coolant passages therein.

The coolant flow through the coolant jacket 30 is introduced through either or both of a pair of inlet fittings. Referring to FIGS. 1 and 4, opposite ends of the manifold 10 have outwardly projecting portions 38 and 40 thereon, respectively. The portions 38 and 40 define and encircle flow passages 42 and 44, respectively. These passages 42 and 44 are internally threaded to accept an inlet nipple or the like (not shown). The nipples are for connection to hoses for supplying coolant to manifold 10. Again, referring to FIGS. 1 and 3, the upper portion of the manifold also includes similarly projecting portions 46 and 48. The portions 46 and 48 define internally threaded outlet flow passages 50 and 52 for attachment to fittings and coolant hoses.

In prior manifolds of this general type utilizing individual exhaust gas passages 24, it was desirable to provide coolant inlet means for introducing coolant to each individual coolant jacket surrounding each individual gas flow passage for desired even circulation about each leg of the manifold. The subject manifold includes a common coolant flow passage means 54 in the form of an elongated tubular portion of the outer and inner walls 12 and 14. Specifically, reference is made to FIGS. 1 and 5 in which the passage 54 is best shown extending along the lower end portions of the manifold. The common coolant passage 54 is fluidly connected to each of the coolant jackets 30 and provides a uniform flow of coolant.

Although only one embodiment of the liquid cooled exhaust manifold has been illustrated and described in detail, it is readily understood that modifications thereto may be made which still fall within the scope of the following claims which define the invention.

We claim:

1. For an internal combustion engine, a liquid cooled exhaust manifold of the type having individual exhaust gas inlets positioned in a low portion of the manifold and fluidly connected to passages extending upwards to an exhaust gas outlet at a higher portion of the manifold, comprising:

a manifold housing having spaced inner and outer wall means, the inner wall means defining individual exhaust gas inlets and passages extending generally upward;

the wall means further defining a common exhaust gas collector portion fluidly connected to the individual gas passages and further defining an outlet aperture located higher in the exhaust manifold than the inlet apertures;

the spaced inner and outer wall means defining a coolant flow passage therebetween including individual coolant passages about each individual exhaust gas passage;

inlet means for liquid coolant located low in the manifold to introduce coolant to the individual coolant flow passages;

outlet means for liquid coolant located higher in the exhaust manifold than the inlet means to discharge coolant from the manifold;

a transversely extending passage forming means extending normally to the upward flow passages low on the manifold and fluidly connected to the individual coolant flow passages whereby the transverse passage means distributes coolant evenly to each individual coolant flow passage.

2. For an internal combustion engine, a liquid cooled exhaust manifold of the type having individual exhaust gas inlets fluidly connected to upwardly extending individual exhaust gas flow passages therein and then fluidly connected to an exhaust gas outlet located at an upper portion of the manifold comprising:

a manifold housing having spaced outer and inner walled portions, the inner walled portions defining the individual exhaust gas inlets and further defining the individual exhaust gas flow passages, the inlet apertures being located in a low portion of the manifold housing and the individual gas flow passages extending generally upward therefrom;

the wall portion of the housing further forming a common exhaust gas connector portion fluidly connected with the individual flow passages, and defining an outlet aperture fluidly connected thereto, the outlet aperture being located in a higher portion of the manifold housing with respect to the inlet apertures;

the spaced inner and outer walled portions of the manifold forming coolant flow passages including individual coolant flow passages encircling each individual exhaust gas flow passage;

inlet means for liquid coolant located low in the manifold housing and outlet means for liquid coolant located high in the manifold housing to produce an upward flow of liquid coolant;

a transversely extending coolant flow passage normal to the upward flow passages fluidly connected to the individual coolant passages to distribute coolant evenly to each individual coolant passage.

3. The manifold set forth in claim 2 in which the housing has a coolant inlet at each end of the manifold fluidly aligned with the transversely extending flow passage.

* * * * *